United States Patent
Chen et al.

(10) Patent No.: US 8,202,971 B2
(45) Date of Patent: Jun. 19, 2012

(54) PROCESS FOR PREPARING COMPOUNDS OF CHITOSAN SACCHARIFIED WITH AMINOSUGAR

(75) Inventors: Xiguang Chen, Qingdao (CN); Jing Li, Qingdao (CN); Xiaojie Cheng, Qingdao (CN); Tao Jiang, Qingdao (CN)

(73) Assignee: Ocean University of China, Laoshan District, Qingdao, Shandong Province (CN)

( * ) Notice: Subject to any disclaimer, the term of this patent is extended or adjusted under 35 U.S.C. 154(b) by 425 days.

(21) Appl. No.: 12/499,767

(22) Filed: Jul. 8, 2009

(65) Prior Publication Data

US 2010/0152430 A1 Jun. 17, 2010

(30) Foreign Application Priority Data

Dec. 12, 2008 (CN) .......................... 2008 1 0238392

(51) Int. Cl.
*C08B 37/08* (2006.01)

(52) U.S. Cl. ......... 536/20; 536/55.2; 536/55.3; 536/124

(58) Field of Classification Search .................. None
See application file for complete search history.

(56) References Cited

U.S. PATENT DOCUMENTS 5,747,475 A * 5/1998 Nordquist et al. .............. 514/55

OTHER PUBLICATIONS

Mourya, V. et al "Chitosan-modifications and applications . . . " Reactive & Functional Polymers (2008) vol. 68, pp. 1013-1051.*

* cited by examiner

*Primary Examiner* — Leigh Maier

(57) ABSTRACT

A process for preparing compounds of chitosan saccharified with aminosugar, adopts chitosan derivatives, aminosugar derivatives and anhydride derivatives as raw materials to synthesize target products. The process comprises: covalently bonding an anhydride derivative as a bonding arm to an aminosugar derivative, so as to form a monosaccharide derivative having an end group of carboxyl; and then covalently bonding the monosaccharide derivative having an end group of carboxyl to a primary amino group of a chitosan derivative via the carboxyl, so as to form a compound of chitosan saccharified with aminosugar.

20 Claims, No Drawings

PROCESS FOR PREPARING COMPOUNDS OF CHITOSAN SACCHARIFIED WITH AMINOSUGAR

BACKGROUND OF THE PRESENT INVENTION

1. Field of Invention

The present invention relates to the biomaterials field, and more particularly to a process for preparing compounds of chitosan saccharified with aminosugar.

2. Description of Related Arts

Chitosan is a natural biological polysaccharide. Due to the advantages of abundance, biodegradability, good stability and good bioaffinity, chitosan is a satisfactory resource for developing biomedical materials. Chitosan has earned much attention in research of facultative molecular materials. In the current researches, there have been reports about preparing conjugate of chitosan grafted with galactose by method of covalent bonding, e.g., covalently bonding polyvinyl alcohol (PEG) and galactose to chitosan molecule in turn. The compound material formed can not only specifically recognize receptor protein on surface of hepatocyte, but also carry hydrophobic drugs. However, it takes complicated steps to prepare the compound mentioned above, and the compound is unstable because its O-glycosidic bond degrades easily in vivo. There have also been reports about compound materials formed by covalently bonding polyvinyl alcohol (PEG) to chitosan molecule. The compound materials are sensitive to pH, but have bad carrying capability. There have also been reports about glycosylation modification to chitosan with galactose for introducing galactose into chitosan molecule, so as to form chitosan compound. However, molecules of the chitosan compound lack of hydrophobic groups, and therefore has drawbacks as carrier materials in application. Obviously, it is important to prepare stable carrier materials which have high carrying capability to hydrophobic drugs in the field of pharmaceutical preparations.

SUMMARY OF THE PRESENT INVENTION

An object of the present invention is to provide a process for preparing compounds of chitosan saccharified with aminosugar, to overcome the drawbacks of current technology.

The present invention adopts chitosan derivatives, aminosugar derivatives and anhydride derivatives as raw materials to synthesize target products by the process comprising two steps. The process comprises:

covalently bonding an anhydride derivative as a bonding arm to an aminosugar derivative, so as to form a monosaccharide derivative having an end group of carboxyl; and then covalently bonding the monosaccharide derivative having an end group of carboxyl to a primary amino group of a chitosan derivative via the carboxyl, so as to form a compound of chitosan saccharified with aminosugar.

Particularly, the process comprises the steps of:

a) a first step comprising:
  a.1 suspending the aminosugar derivative in a first mixed solution comprising methanol and sodium methoxide, then
  a.2 adding the anhydride derivative into the first mixed solution drop by drop to react, then
  a.3 adding a catalyst into the first mixed solution and controlling concentration, temperature, pH and time of reacting, and then
  a.4 adding hydrochloric acid to end reacting, so as to obtain the monosaccharide derivative having an end group of carboxyl; and b) a second step comprising:
  b.1 mixing the monosaccharide derivative having an end group of carboxyl obtained in the first step with the chitosan derivative,
  b.2 adding a catalyst and controlling concentration, temperature, pH and time of reacting, so as to obtain a second mixed solution comprising a product and raw materials of a covalent compound of chitosan, and then
  b.3 separating the second mixed solution to purify the product, and drying to obtain the solid product of the compound of chitosan saccharified with aminosugar.

The present invention has the advantages of convenient operation, simple preparing process, and low product cost. The present invention is applicable to raw materials widely, including all chitosan derivatives having free amino groups. The present invention is also applicable to aminosugar derivatives widely, and especially to all monosaccharides and the derivatives thereof which are combinable with carboxyl or anhydride groups. The present invention is further applicable to anhydride derivatives widely, and especially to all anhydrides and derivatives of binary acids which are combinable with primary amino group. Therefore, the present invention is not only applicable to current glycosylated chitosan derivatives, but also to preparation of chitosan compounds which have both hydrophilic region and hydrophobic region, and have target groups. Additionally, the present invention is significant that the materials produced have good stability and can form self-aggregation of molecule, so that the materials can be used to produce dispersants of hydrophobic drugs. Besides, the materials can form capsule-like molecular beams, so that the materials are optional to develop target nanometer medicine capsules.

The present invention adopts chitosan derivatives, aminosugar derivatives and anhydride derivatives as raw materials to prepare facultative polymer materials. The materials obtained are new members of chitosan derivatives. The materials are safe, and have good biocompatibility and biodegradability but no toxic or side effects. The present invention has good prospects of researching and developing in medicine, medical materials, food, cosmetics, environmental protection, agriculture, and so on. Therefore, the materials have good economic developing potential.

These and other objectives, features, and advantages of the present invention will become apparent from the following detailed description and the appended claims.

DETAILED DESCRIPTION OF THE PREFERRED EMBODIMENT

A process for preparing a compound of chitosan saccharified with aminosugar according to a preferred embodiment of the present invention is illustrated, comprising a first step and a second step.

a) The first step comprises:
  a.1 suspending an aminosugar derivative in a first mixed solution comprising methanol and sodium methoxide, wherein a concentration of the aminosugar derivative is 1~10%, a weight of the sodium methoxide is 0.5~3 times as great as a weight of the aminosugar derivative, a stirring speed is 30~80 r/min, a reacting temperature is 20~30° C., a reacting time is 2~4 hours, the reacting is protected by an inert gas; then
  a.2 adding an anhydride derivative into the first mixed solution drop by drop to react, wherein a mole ratio of the anhydride derivative to the aminosugar derivative is 1:1, a stirring speed is 30~80 r/min, a reacting temperature is 20~30° C., a reacting time is 24~60 hours; and then a. 3 adding 0.1M hydrochloric acid until a pH=6 to end reacting, drying under 40~60° C., recrystallizing with absolute alcohol, and processing vacuum drying to obtain a monosaccharide derivative having an end group of carboxyl.

To expedite the reacting speed, the first step further comprises:

a. 4 adding a catalyst A after mixing the aminosugar derivative and the anhydride derivative. The catalyst A is 1~4 times the weight of the anhydride derivative, and the reacting time can be shortened to 12~48 hours. The catalyst A is selected from the group consisting of triethylamine, tributylamine and dimethylfomamide.

b) The second step comprises:

b. 1 dissolving the monosaccharide derivative having an end group of carboxyl which is obtained in the first step with distilled water, controlling a concentration thereof in 0.5~10%, and adjusting a pH thereof to 5~7 with 0.1M hydrochloric acid, so as to obtain a monosaccharide solution;

b. 2 dissolving a chitosan derivative which has a degree of deacetylation of 50~100% into a solution comprising 0~80% methanol, and controlling a concentration of the chitosan derivative in 0.5~10%, so as to obtain a chitosan solution; then b. 3 mixing the monosaccharide solution with the chitosan solution to obtain a second mixed solution, wherein a stirring speed is 30~80 r/min, a reacting temperature is 20~30° C., a reacting time is 48~72 hours;

b. 4 after reacting of step b.3, condensing the second mixed solution by evaporation under 40~60° C. to reduce a volume thereof to 1/20~1/5; and then b. 5 depositing the condensed second mixed solution with absolute alcohol which is 10~20 times the volume of the condensed second mixed solution, processing vacuum filtrating, and processing vacuum drying to obtain a solid compound of chitosan saccharified with aminosugar.

To expedite the reacting speed, the second step further comprises:

b. 6 adding a catalyst B after mixing the monosaccharide solution and the chitosan derivative. The catalyst B is 0.05~1 times the weight of the monosaccharide derivative, and the reacting time can be shortened to 24~48 hours. The catalyst B is selected from the group consisting of EDC [N-ethyl-N'-(3-dimethylaminopropyl) carbodiimide], DMAP (4-Dimethylaminopyridine), and DCC (Dicyclohexylcarbodiimide).

Particularly, the chitosan derivative is selected from the group consisting of chitosan, chitin oligosaccharides, carboxymethyl chitosan, hydroxyethyl chitosan, hydroxypropyl chitosan, and chitosan grafted with polyvinyl alcohol.

Particularly, the aminosugar derivative is selected from the group consisting of amino monosaccharides consisting of glucosamine and galactosamine, and amino monosaccharide derivatives consisting of glucosamine hydrochloride, glucosamine sulfate, galactosamine hydrochloride, and 4-amino-4-deoxy-D-methyl glucoside.

Particularly, the anhydride derivative is selected from the group consisting of binary fatty acid anhydrides consisting of succinic anhydride, glutaric anhydride, and maleic anhydride, and aromatic anhydride derivatives consisting of phthalic anhydride, phthalic anhydride derivatives, naphthalic anhydride and naphthalic anhydride derivatives.

EXAMPLE 1

Suspending 6 g of glucosamine in 60 ml of methanol, adding 12 g of sodium methoxide, 24° C., protecting with argon, stirring in speed of 50 r/min for 4 hours; adding 4.96 g of succinic anhydride, 24° C., stirring in speed of 50 r/min for 24 hours; adding 0.1M HCl until pH=6, ending reaction; drying by distillation under 50° C., recrystallizing with absolute alcohol, and processing vacuum drying to obtain a monosaccharide derivative having an end group of carboxyl, wherein a yield thereof is 9.3%.

Preparing 20 ml of a first solution containing 2% of the monosaccharide derivative having an end group of carboxyl, adjusting a pH of the first solution to 6.3 with 0.1M HCl, adding the first solution into 50 ml of a second solution containing 5% of carboxymethyl chitosan and 30% of methanol, 22° C., stirring in speed of 70 r/min for 48 hours; condensing by evaporation under 50° C., reducing a volume thereof to 14 ml, finally depositing with 140 ml of absolute alcohol, processing vacuum filtrating, and processing vacuum drying to obtain a product, wherein a yield thereof is 51% (weight of product/weight of chitosan derivative*100%).

EXAMPLE 2

Suspending 3 g of galactosamine hydrochloride in 40 ml of methanol, adding 4.5 g of sodium methoxide, 20° C., protecting with argon, stirring in speed of 50 r/min for 3 hours; adding 2.58 g of naphthalic anhydride, 24° C., stirring in speed of 40 r/min for 60 hours; adding 0.1M HCl until pH=6, ending reaction; drying by distillation under 50° C., recrystallizing with absolute alcohol, and processing vacuum drying to obtain a monosaccharide derivative having an end group of carboxyl, wherein a yield thereof is 9.8%.

Preparing 20 ml of a first solution containing 1.2% of the monosaccharide derivative having an end group of carboxyl, adjusting a pH of the first solution to 6.2 with 0.1M HCl, adding the first solution into 50 ml of a second solution containing 3% of hydroxypropyl chitosan and 50% of methanol, 26° C., stirring in speed of 60 r/min for 72 hours; condensing by evaporation under 50° C., reducing a volume thereof to 7 ml, finally depositing with 100 ml of absolute alcohol, processing vacuum filtrating, and processing vacuum drying to obtain a product, wherein a yield thereof is 56% (weight of product/weight of chitosan derivative*100%).

EXAMPLE 3

Suspending 1 g of galactosamine in 100 ml of methanol, adding 0.5 g of sodium methoxide, 20° C., protecting with argon, stirring in speed of 60 r/min for 3 hours; adding 0.64 g of glutaric anhydride and 0.82 ml of a catalyst A of tributylamine in turn, 24° C., stirring in speed of 60 r/min for 24 hours; adding 0.1M HCl until pH=6, ending reaction; drying by distillation under 40° C., recrystallizing with absolute alcohol, and processing vacuum drying to obtain a monosaccharide derivative having an end group of carboxyl, wherein a yield thereof is 11.5%.

Preparing 20 ml of a first solution containing 0.5% of the monosaccharide derivative having an end group of carboxyl, adjusting a pH of the first solution to 5 with 0.1M HCl, adding the first solution into 50 ml of a second solution containing 0.5% of chitosan and 80% of methanol, adding 0.1 g of a catalyst B of DCC, 24° C., stirring in speed of 60 r/min for 24 hours; condensing by evaporation under 40° C., reducing a volume thereof to 7 ml, finally depositing with 140 ml of absolute alcohol, processing vacuum filtrating, and processing vacuum drying to obtain a product, wherein a yield thereof is 51% (weight of product/weight of chitosan derivative*100%).

EXAMPLE 4

Suspending 8.0 g of glucosamine sulfate in 80 ml of methanol, adding 8.0 g of sodium methoxide, 30° C., protecting with argon, stirring in speed of 80 r/min for 4 hours; adding 4.23 g of phthalic anhydride and 17.91 ml of a catalyst A of dimethylfomamide in turn, 28° C., stirring in speed of 70 r/min for 48 hours; adding 0.1M HCl until pH=6, ending reaction; drying by distillation under 50° C., recrystallizing with absolute alcohol, and processing vacuum drying to obtain a monosaccharide derivative having an end group of carboxyl, wherein a yield thereof is 17.6%.

Preparing 20 ml of a first solution containing 10% of the monosaccharide derivative having an end group of carboxyl, adjusting a pH of the first solution to 7 with 0.1M HCl, adding the first solution into 50 ml of a second solution containing 10% of hydroxyethyl chitosan, adding 0.1 g of a catalyst B of EDC, 20° C., stirring in speed of 30 r/min for 48 hours; condensing by evaporation under 50° C., reducing a volume thereof to 14 ml, finally depositing with 140 ml of absolute alcohol, processing vacuum filtrating, and processing vacuum drying to obtain a product, wherein a yield thereof is 68% (weight of product/weight of chitosan derivative*100%).

EXAMPLE 5

Suspending 4 g of 4-amino-4-deoxy-D-methyl glucoside in 160 ml of methanol, adding 12 g of sodium methoxide, 28° C., protecting with argon, stirring in speed of 40 r/min for 3 hours; adding 2 g of maleic anhydride and 5.12 ml of a catalyst A of tributylamine in turn, 20° C., stirring in speed of 80 r/min for 12 hours; adding 0.1M HCl until pH=6, ending reaction; drying by distillation under 50° C., recrystallizing with absolute alcohol, and processing vacuum drying to obtain a monosaccharide derivative having an end group of carboxyl, wherein a yield thereof is 14.1%.

Preparing 20 ml of a first solution containing 3% of the monosaccharide derivative having an end group of carboxyl, adjusting a pH of the first solution to 5.6 with 0.1M HCl, adding the first solution into 50 ml of a second solution containing 4% of chitosan grafted with polyvinyl alcohol and 40% of methanol, adding 0.3 g of a catalyst B of DMAP, 30° C., stirring in speed of 80 r/min for 30 hours; condensing by evaporation under 60° C., reducing a volume thereof to 10 ml, finally depositing with 150 ml of absolute alcohol, processing vacuum filtrating, and processing vacuum drying to obtain a product, wherein a yield thereof is 58% (weight of product/weight of chitosan derivative*100%).

EXAMPLE 6

Suspending 2 g of glucosamine hydrochloride in 40 ml of methanol, adding 4 g of sodium methoxide, 24° C., protecting with argon, stirring in speed of 30 r/min for 2 hours; adding 0.93 g of succinic anhydride and 4 ml of a catalyst A of triethylamine in turn, 24° C., stirring in speed of 30 r/min for 48 hours; adding 0.1M HCl until pH=6, ending reaction; drying by distillation under 60° C., recrystallizing with absolute alcohol, and processing vacuum drying to obtain a monosaccharide derivative having an end group of carboxyl, wherein a yield thereof is 13.3%.

Preparing 20 ml of a first solution containing 0.85% of the monosaccharide derivative having an end group of carboxyl, adjusting a pH of the first solution to 6 with 0.1M HCl, adding the first solution into 50 ml of a second solution containing 2% of chitin oligosaccharides and 60% of methanol, adding a catalyst B containing 0.1 g of EDC and 0.05 g of DMAP, 24° C., stirring in speed of 50 r/min for 36 hours; condensing by evaporation under 50° C., reducing a volume thereof to 3.5 ml, finally depositing with 70 ml of absolute alcohol, processing vacuum filtrating, and processing vacuum drying to obtain a product, wherein a yield thereof is 62% (weight of product/weight of chitosan derivative*100%).

One skilled in the art will understand that the embodiment of the present invention as described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:
1. A process for preparing a compound of chitosan saccharified with aminosugar, comprising the steps of:
   a) reacting an aminosugar derivative with an anhydride derivative to covalently bond the anhydride derivative as a bonding arm to the aminosugar derivative, comprising:
     (a1) suspending the aminosugar derivative in a first mixed solution comprising methanol and sodium methoxide, wherein a concentration of the aminosugar derivative is 1~10%, a weight of the sodium methoxide is 0.5~3 times as great as a weight of the aminosugar derivative, a stirring speed is 30~80 r/min, a reacting temperature is 20~30° C., a reacting time is 2~4 hours, the reacting is protected by an inert gas, then
     (a2) adding the anhydride derivative into the first mixed solution drop by drop to react, wherein a mole ratio of the anhydride derivative to the aminosugar derivative is 1:1, a stirring speed is 30~80 r/min, a reacting temperature is 20~30° C., a reacting time is 24~60 hours, and then
     (a3) adding 0.1M hydrochloric acid until a pH=6 to end reacting, drying under 40~60° C., recrystallizing with absolute alcohol, and processing vacuum drying to obtain a monosaccharide derivative having an end group of carboxyl; and
   b) reacting the monosaccharide derivative having an end group of carboxyl obtained in the step a) with an chitosan derivative to covalently bond the monosaccharide derivative having an end group of carboxyl to a primary amino group of the chitosan derivative via the carboxyl, comprising:
     (b1) dissolving the monosaccharide derivative having an end group of carboxyl which is obtained in the step a) with distilled water, and controlling a concentration thereof in 0.5~10%, and adjusting a pH thereof to 5~7 with 0.1M hydrochloric acid, so as to obtain a monosaccharide solution,
     (b2) dissolving the chitosan derivative which has a degree of deacetylation of 50~100% into a solution comprising 0~80% methanol, and controlling a con- centration of the chitosan derivative in 0.5~10%, so as to obtain a chitosan solution, then (b3) mixing the monosaccharide solution with the chitosan solution to obtain a second mixed solution, wherein a stirring speed is 30~80 r/min, a reacting temperature is 20~30° C., a reacting time is 48~72 hours, (b4) after reacting of step b.3, condensing the second mixed solution by evaporation under 40~60° C. to reduce a volume thereof to $\frac{1}{20}$~$\frac{1}{5}$, and then (b5) depositing the condensed second mixed solution with absolute alcohol which is 10~20 times the volume of the condensed second mixed solution, processing vacuum filtrating, and processing vacuum drying to obtain a solid compound of chitosan saccharified with aminosugar.

2. The process, as recited in claim 1, wherein the step a) further comprises:

(a4) adding a catalyst A after mixing the aminosugar derivative and the anhydride derivative to shorten the reacting time thereof, wherein the catalyst A is selected from the group consisting of triethylamine, tributylamine and dimethylfomamide.

3. The process, as recited in claim 1, wherein the step b) further comprises:

(b6) adding a catalyst B after mixing the monosaccharide solution and the chitosan derivative to shorten the reacting time thereof, wherein the catalyst B is selected from the group consisting of EDC, DMAP, and DCC.

4. The process, as recited in claim 1, wherein the aminosugar derivative is selected from the group consisting of glucosamine, galactosamine, glucosamine hydrochloride, glucosamine sulfate, galactosamine hydrochloride, and 4-amino-4-deoxy-D-methyl glucoside.

5. The process, as recited in claim 2, wherein the aminosugar derivative is selected from the group consisting of glucosamine, galactosamine, glucosamine hydrochloride, glucosamine sulfate, galactosamine hydrochloride, and 4-amino-4-deoxy-D-methyl glucoside.

6. The process, as recited in claim 1, wherein the anhydride derivative is selected from the group consisting of binary fatty acid anhydrides consisting of succinic anhydride, glutaric anhydride, and maleic anhydride, and aromatic anhydride derivatives consisting of phthalic anhydride, phthalic anhydride derivatives, naphthalic anhydride and naphthalic anhydride derivatives.

7. The process, as recited in claim 2, wherein the anhydride derivative is selected from the group consisting of binary fatty acid anhydrides consisting of succinic anhydride, glutaric anhydride, and maleic anhydride, and aromatic anhydride derivatives consisting of phthalic anhydride, phthalic anhydride derivatives, naphthalic anhydride and naphthalic anhydride derivatives.

8. The process, as recited in claim 1, wherein the chitosan derivative is selected from the group consisting of chitosan, chitin oligosaccharides, carboxymethyl chitosan, hydroxyethyl chitosan, hydroxypropyl chitosan, and chitosan grafted with polyvinyl alcohol.

9. The process, as recited in claim 3, wherein the chitosan derivative is selected from the group consisting of chitosan, chitin oligosaccharides, carboxymethyl chitosan, hydroxyethyl chitosan, hydroxypropyl chitosan, and chitosan grafted with polyvinyl alcohol.

10. The process, as recited in claim 2, wherein the catalyst A is 1~4 times the weight of the anhydride derivative.

11. The process, as recited in claim 3, wherein the catalyst B is 0.05~1 times the weight of the monosaccharide derivative.

12. A compound of chitosan saccharified with aminosugar, prepared by a process comprising the steps of:

a) reacting an aminosugar derivative with an anhydride derivative to covalently bond the anhydride derivative as a bonding arm to the aminosugar derivative, comprising:

(a1) suspending the aminosugar derivative in a first mixed solution comprising methanol and sodium methoxide, wherein a concentration of the aminosugar derivative is 1~10%, a weight of the sodium methoxide is 0.5~3 times as great as a weight of the aminosugar derivative, a stirring speed is 30~80 r/min, a reacting temperature is 20~30° C., a reacting time is 2~4 hours, the reacting is protected by an inert gas, then (a2) adding the anhydride derivative into the first mixed solution drop by drop to react, wherein a mole ratio of the anhydride derivative to the aminosugar derivative is 1:1, a stirring speed is 30~80 r/min, a reacting temperature is 20~30° C., a reacting time is 24~60 hours, and then (a3) adding 0.1M hydrochloric acid until a pH=6 to end reacting, drying under 40~60° C., recrystallizing with absolute alcohol, and processing vacuum drying to obtain a monosaccharide derivative having an end group of carboxyl; and b) reacting the monosaccharide derivative having an end group of carboxyl obtained in the step a) with an chitosan derivative to covalently bond the monosaccharide derivative having an end group of carboxyl to a primary amino group of the chitosan derivative via the carboxyl, comprising:

(b1) dissolving the monosaccharide derivative having an end group of carboxyl which is obtained in the step a) with distilled water, and controlling a concentration thereof in 0.5~10%, and adjusting a pH thereof to 5~7 with 0.1M hydrochloric acid, so as to obtain a monosaccharide solution, (b2) dissolving the chitosan derivative which has a degree of deacetylation of 50~100% into a solution comprising 0~80% methanol, and controlling a concentration of the chitosan derivative in 0.5~10%, so as to obtain a chitosan solution, then (b3) mixing the monosaccharide solution with the chitosan solution to obtain a second mixed solution, wherein a stirring speed is 30~80 r/min, a reacting temperature is 20~30° C., a reacting time is 48~72 hours, (b4) after reacting of step b.3, condensing the second mixed solution by evaporation under 40~60° C. to reduce a volume thereof to $\frac{1}{20}$~$\frac{1}{5}$, and then (b5) depositing the condensed second mixed solution with absolute alcohol which is 10~20 times the volume of the condensed second mixed solution, processing vacuum filtrating, and processing vacuum drying to obtain a solid compound of chitosan saccharified with aminosugar.

13. A process for preparing a compound of chitosan saccharified with aminosugar, comprising:

a) reacting an aminosugar derivative with an anhydride derivative to covalently bond the anhydride derivative as a bonding arm to the aminosugar derivative; and b) reacting the monosaccharide derivative having an end group of carboxyl obtained in the step a) with an chitosan derivative to covalently bond the monosaccharide derivative having an end group of carboxyl to a primary amino group of the chitosan derivative via the carboxyl.

14. The process, as recited in claim 13, wherein the step a) further comprises:
adding a catalyst A after mixing the aminosugar derivative and the anhydride derivative to shorten the reacting time thereof, wherein the catalyst A is selected from the group consisting of triethylamine, tributylamine and dimethylfomamide.

15. The process, as recited in claim 13, wherein the step b) further comprises:
adding a catalyst B after mixing the monosaccharide solution and the chitosan derivative to shorten the reacting time thereof, wherein the catalyst B is selected from the group consisting of EDC, DMAP, and DCC.

16. The process, as recited in claim 13, wherein the aminosugar derivative is selected from the group consisting of glucosamine, galactosamine, glucosamine hydrochloride, glucosamine sulfate, galactosamine hydrochloride, and 4-amino-4-deoxy-D-methyl glucoside.

17. The process, as recited in claim 13, wherein the anhydride derivative is selected from the group consisting of binary fatty acid anhydrides consisting of succinic anhydride, glutaric anhydride, and maleic anhydride, and aromatic anhydride derivatives consisting of phthalic anhydride, phthalic anhydride derivatives, naphthalic anhydride and naphthalic anhydride derivatives.

18. The process, as recited in claim 13, wherein the chitosan derivative is selected from the group consisting of chitosan, chitin oligosaccharides, carboxymethyl chitosan, hydroxyethyl chitosan, hydroxypropyl chitosan, and chitosan grafted with polyvinyl alcohol.

19. The process, as recited in claim 14, wherein the catalyst A is 1~4 times the weight of the anhydride derivative.

20. The process, as recited in claim 15, wherein the catalyst B is 0.05~1 times the weight of the monosaccharide derivative.

* * * * *